United States Patent
Richard et al.

(10) Patent No.: US 8,692,772 B2
(45) Date of Patent: Apr. 8, 2014

(54) COMMUNICATION ZONE ON A KEYBOARD

(75) Inventors: Alexis Richard, Cully (CH); Alain Tabasso, Essertines (CH); Denis Pavillard, Monnaz (CH); Patrick Monney, Mex (CH); Sergio Lazzarotto, Bercher (CH); Stephan Proennecke, Chene-Bougeries (CH)

(73) Assignee: Logitech Europe S.A., Morges (CH)

( * ) Notice: Subject to any disclaimer, the term of this patent is extended or adjusted under 35 U.S.C. 154(b) by 0 days.

(21) Appl. No.: 10/885,935

(22) Filed: Jul. 6, 2004

(65) Prior Publication Data

US 2006/0019648 A1    Jan. 26, 2006

(51) Int. Cl.
*G09G 5/00* (2006.01)

(52) U.S. Cl.
USPC ........ 345/168; 455/420; 455/575.1; 455/560; 455/557; 455/419; 345/169

(58) Field of Classification Search
USPC .................. 455/420, 560, 41.3, 557, 41, 551, 455/575.1; 400/472; 345/168–169
See application file for complete search history.

(56) References Cited

U.S. PATENT DOCUMENTS

| | | | | |
|---|---|---|---|---|
| 6,489,950 B1* | 12/2002 | Griffin et al. | ................. | 345/168 |
| 6,625,472 B1* | 9/2003 | Farazmandnia et al. | ...... | 455/557 |
| 6,664,949 B1* | 12/2003 | Amro et al. | ................... | 345/168 |
| 2002/0103008 A1 | 8/2002 | Rahn et al. | | |
| 2002/0128041 A1* | 9/2002 | Parry | ........................... | 455/560 |
| 2003/0092437 A1* | 5/2003 | Nowlin et al. | ................ | 455/420 |
| 2004/0126171 A1* | 7/2004 | McLoone et al. | ............. | 400/472 |
| 2005/0025549 A1* | 2/2005 | McLoone | ..................... | 400/472 |
| 2005/0036814 A1* | 2/2005 | Sim | .............................. | 400/472 |
| 2005/0070225 A1* | 3/2005 | Lee | .............................. | 455/41.3 |
| 2005/0078090 A1* | 4/2005 | Glatzer et al. | ................ | 345/168 |

\* cited by examiner

*Primary Examiner* — Kiet Doan
*Assistant Examiner* — Michael T Vu
(74) *Attorney, Agent, or Firm* — Kilpatrick Townsend & Stockton LLP

(57) ABSTRACT

A control device is provided that is configured to provide control commands to a computing device, and the computing device is configured to wirelessly communicate information with a mobile device. The control device including a communication zone that includes at least one button configured to be pressed once by a user to effect wireless-data transfer between the computing device and the mobile device.

40 Claims, 3 Drawing Sheets

COMMUNICATION ZONE ON A KEYBOARD

BACKGROUND OF THE INVENTION

The present invention relates to communication devices, and more particularly relates to a keyboard having a communication zone for effecting communication between a mobile device and a computing device.

To keep information current in a mobile device, a user might enter new information directly into the mobile device via a keyboard, touchpad or the like on the mobile device. A user might also enter the new information onto a computer that is configured to transfer the new information into a mobile device. In the process of loading the new information into a mobile device, the computer might also receive information from the mobile device and determine whether to synchronize one or more of the computer's databases with the information received from the mobile device.

As the number of mobile devices any one user might use increases, synchronization of information between mobile devices is desired. For example, a user might want to transfer a telephone list from a personal-digital assistant (PDA) to a mobile telephone so that the user may more easily use the mobile telephone without using the PDA as a reference for telephone numbers. Generally, synchronization of information in mobile devices and computers provides for optimal use of these devices as they may easily be used independently of each other once information has been synchronized.

Traditional devices used for synchronizing information in computers and PDAs include cradle devices that are configured to receive a PDA and have a communication-wire connection to a computer for communicating information between a PDA and a computer. While some manufacturers provide cradles with a button to initiate synchronization, these devices fail to provide synchronization with different types of devices as the cradles are dedicated for use with a single type of device, and fail to provide other features that enhance the use of devices independently from each other. As traditional cradle devices fail in a number of ways, devices configured for use with such cradle devices may not be optimally used by a user.

Accordingly, there is a need for new apparatus and techniques that are easy to use and provide fast and convenient transfer of information between mobile devices and other computing devices.

BRIEF SUMMARY OF THE INVENTION

According to one embodiment of the present invention, a control device is provided that is configured to provide a control command to a computing device, and the computing device is configured to wirelessly communicate information with a mobile device in response to receiving the control command. The control device includes a communication zone including at least one button configured to be pressed once by a user to effect wireless-data transfer between the computing device and the mobile device. According to a specific embodiment, the at least one button is configured to be pressed once by a user to effect the wireless-data transfer between the computing device and the mobile device if the mobile device is proximately positioned with respect to the computing device. According to another specific embodiment, the mobile device is proximately positioned with respect to the computing device if the mobile device is approximately at or within about fifteen meters of the computing device. According to another specific embodiment, the control device further includes at least one of an icon and text is configured to identify the mobile device. According to another specific embodiment, the control device is a keyboard. According to another specific embodiment, the communication zone is positioned at approximately a forward-corner area of a top surface of the keyboard. The mobile device includes at least one of a mobile telephone, a personal digital assistant, a digital camera, a digital-video camera, a digital-music player, and a smart-mobile telephone. The wireless-data transfer includes at least one of a text message, an audio file, a video file, a picture file, and contact information. According to another specific embodiment, the communication zone further includes a plurality of buttons, which includes the first mentioned button, wherein each button is configured to be pressed once to effect a wireless-data transfer between the computing device and a corresponding mobile device of a plurality of mobile devices, which includes the first mentioned mobile device, if the corresponding mobile device is proximately positioned with respect to the computing device. The wireless data transfer includes at least one of a text message, an audio file, a video file, a picture file, a note, and contact information. According to another specific embodiment, the control device is a mouse. The computing device includes at least one of a personal computer, a laptop computer, a personal digital assistant, and a server computer. According to another specific embodiment, the button is a scroll wheel and the scroll wheel is configured to be rotated by a user to select the mobile device from a plurality of mobile devices configured to wirelessly communicate with the computing device.

According to another embodiment, a communication system includes a control device having a communication zone that includes at least one button; a computing device operatively coupled to the control device; and a mobile device configured to wirelessly communicate with the computing device if the button is pressed once by a user. According to a specific embodiment, the mobile device is configured to wirelessly communicate with the computing device if the mobile device is proximately disposed with respect to the computing device. The mobile device might be proximately disposed with respect to the computing device if the mobile device is approximately at or within about fifteen meters of the computing device.

According to another embodiment, a control device includes a communication zone including a scroll wheel configured to be scrolled by a user to select a mobile device from a plurality of mobile devices, and at least one button configured to be pressed once to effect a wireless-data transfer between a computing device and the mobile device selected from the plurality of mobile devices. The scroll wheel and the button might be the same device.

According to another embodiment, a method is provided for wirelessly transferring information between a computing device and a mobile device. The method includes pressing a key in a communication zone of a control device a single time; in response to the single key press, transferring information between the computing device and the mobile device if the mobile device is locally positioned with respect to the computing device. According to a specific embodiment, the method further includes scrolling a scroll wheel to select the mobile device from a plurality of mobile devices. The key and the scroll wheel might be the same device.

A further understanding of the nature and advantages of the present invention may be realized by reference to the remaining portions of the specification and the drawings.

DETAILED DESCRIPTION OF THE INVENTION

The present invention provides an apparatus and technique for wirelessly transferring information between a mobile device and a computing device, and more particularly provides a keyboard that includes a communication zone having keys that are configured to provide for one-push-wireless connection and information transfer between a mobile device and a computing device.

Figure 1:
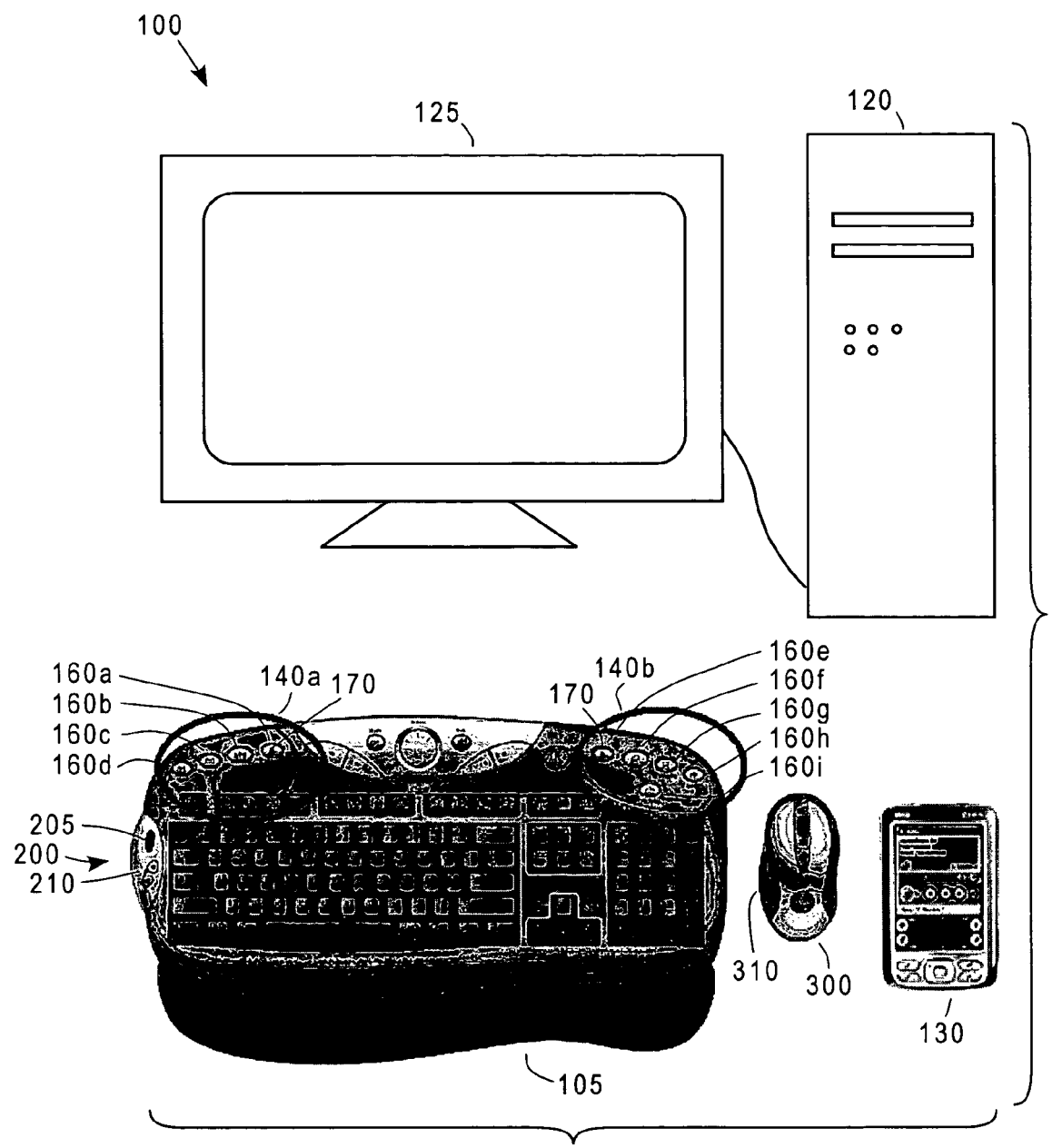
FIG. 1 is a simplified diagram of an information-transfer system according to an embodiment of the present invention.

FIG. 1 is a simplified diagram of an information-transfer system 100 according to an embodiment of the present invention. Information-transfer system 100 includes a keyboard 105, a computing device 120, a display 125, and at least one mobile device 130. Keyboard 105 includes a communication zone 140a that is indicated generally by the line around keys 160a-160d in FIG. 1. According to some embodiments, keyboard 105 includes a second communication zone 140b indicated generally by the line around keys 160e-160i in FIG. 1. Communication zone 140a and 140b might be disposed, respectively, at forward left and right portions of the top surface of the keyboard. Keyboard 105 may be a hardwired device or a wireless device, and may be configured for hardwire communication or wireless communication with computing device 120. Computing device 120 may include a variety of computing devices, such as a personal computer, a laptop computer, a personal digital assistant (PDA), a server system or another device configured to communicate with keyboard 105. While computing device 120, display 125, and keyboard 105 are shown as discrete devices, the computing device, display, and/or keyboard may be integrated into one or more devices, such as integrated into a laptop computer, a PDA or the like. While mobile device 130 shown in FIG. 1 is a PDA, mobile device 130 might alternatively be a mobile telephone, a smart-mobile telephone (e.g., configured to perform telephonic functions as well as other functions, such as send and receive e-mail, provide PDA functions or the like), a digital camera, a digital-video camera, a digital music player (e.g., an MP3 player), a mobile e-mail device or the like. The mobile device might alternatively be a secondary display that is configured to display information displayed on display 125. For example, the secondary display might be a relatively small display configured to display information that a user wishes to view as the display on display 125 is changed.

According to one embodiment, computing device 120 is configured to wirelessly transfer information to mobile device 130. According to other embodiments, mobile device 130 is configured to wirelessly transfer information to mobile device 130. The computing device and mobile device might also be configured to wirelessly exchange information. For example, if mobile device 130 is a telephonic device (mobile telephone, smart-mobile telephone, or other device with telephonic capabilities), then computing device 120 and mobile device 130 may be configured to wirelessly exchange a phone list, a text message, such as short message service (SMS) messages (relatively short text messages having about 100 to about 300 characters), a multimedia message, such as multimedia messaging service (MMS) messages (e.g., messages including at least one of text, video, audio, and/or pictures) or other message types. According to another example, if the mobile device is a digital-music player, such as an MP3 player or the like, the computing device and the digital-music player may be configured to transfer audio files, such as MP3 files, to one another. According to another example, if the mobile device is a digital camera, the computing device and the digital camera may be configured to wirelessly transfer pictures, video, and/or audio to one another. Computing device 120 and mobile device 130 may be configured to synchronize their respective databases with information wirelessly received from one another. That is, the computing device and mobile device may be configured to receive information from one another and compare the information to other resident information, and determine whether to update the resident information if the received information includes new information. Synchronization as referred to herein includes one-way synchronization (i.e., one of the computing device and the mobile device might update their resident information) or two-way synchronization (i.e., both the computing device and the mobile device might update their resident information). For example, e-mail messages, contact information (e.g., telephone numbers, addresses, e-mail addresses, etc), notes, calendar entries, etc. might be wirelessly synchronized between the computing device and the mobile device. Further if the mobile device is a secondary display, a user might select a screen (or a portion of a screen) displayed on display 125 for display on the secondary display. The transfer of the selected screen (or selected screen portion) may be wirelessly transferred to the secondary display. The secondary display might be configured to display the selected and transferred screen (or selected screen portion) after the display on display 125 has changed.

Wireless information may be transferred between the computing device and the mobile device in a variety of formats, such as a wireless file transfer protocol (FTP), the BlueTooth protocol or other wireless protocols. Wireless information may be carried on a variety of carrier waves, such as a 27 megahertz carrier wave, a 900 megahertz carrier wave, 2.4 gigahertz carrier wave or the like. Those of skill in the art will understand that the foregoing carrier waves might include a spectrum of carrier waves and not necessarily a single frequency carrier wave.

According to one embodiment, computing device 120 is configured to wirelessly transfer information to and/or wirelessly receive information from mobile device 130 if the mobile device is locally positioned with respect to the computing device (e.g., at or within about fifteen meters from the computing device). Communication distances between the computing device and mobile device might vary, for example, based on the carrier wave frequency used for the information transfer. For example, if a 27 megahertz carrier is used to wirelessly transfer information, communication between the computing device and mobile device might be about a 2-3 meters. If a 2.4 gigahertz carrier is used to wirelessly transfer information, communication between the computing device and mobile device might be about 10 meters.

According to one embodiment, keys 160, in at least one of the communication zones, are configured to effect wireless-information transfer between mobile devices that correspond to the keys and the computing device. Text and/or icons 150 might be disposed on or next to the keys and might designate the type of mobile device the key is configured to effect communication for. For example, icons disposed on or next the keys might include a telephone icon, a PDA icon, camera icon, or the like.

According to one embodiment, pushing one of the keys 160 a single time effects wireless-information transfer to, from, or between the computing device and the mobile device associated with the pushed key. As referred to herein, effecting wireless-information transfer might include triggering communication software and hardware in the computing device to i) initiate communication with a mobile device associated with a pressed key, ii) transfer of information to and/or receipt of information from the mobile device, and iii) conclude the communication. For example, the pressing one of keys 160 a single time might effect a wireless synchronization of information between the computing device and a mobile device associated with the pressed key.

According to one embodiment, keyboard 105 includes a set of indicators 170 that are configured to indicate a wireless transfer of information as described above. As referred to herein, a set includes one or more members. The set of indicators might include one or more LEDs that are configured to light to indicate a wireless transfer of information. For example, the set of indicators 170 might include LEDs that are respectively associated with the keys and the mobile devices respectively associated with the key, and are configured to light to indicate a wireless transfer of information with respectively associated mobile devices. Icons and/or text might be positioned (e.g., printed) adjacent to the LEDs to indicate the associations between the LEDS and the mobile devices. For example, icons may be disposed next to a set of LEDs and include a mobile telephone icon, a PDA icon, a digital-camera icon, a digital-video camera icon or the like. The set of LEDs might include one LED configured to radiate a number of colors of light that are respectively associated with a set of mobile devices that are configured to wirelessly communicate with the computing device, wherein each radiated color indicates a wireless communication between the computing device and the mobile device associated with the radiated color. The set of indicators might alternatively include a display (e.g., a liquid crystal display, an active matrix display or the like, not shown) that is configured to display a graphic (e.g., an icon) or text that indicates a wireless transfer of information. For example, the display may be configured to display an icon representing a mobile device that the computing device is wirelessly transferring information to and/or wirelessly receiving information from. Those of skill in the art will know of other indicators that might be included in set 170 to indicate a wireless transfer of information. Therefore, the foregoing described example indicator should not be viewed as limiting the invention to the described examples.

According to another embodiment, a communication zone 200 might be included on keyboard 105. While communication zones 140a, 140b, and 200 are each shown on keyboard 105, keyboards according to embodiments of the present invention might include one or more of these communication zones. For example, a keyboard according to one embodiment, might include communication zones 140a and 200, whereas a keyboard according to another embodiment, might include only communication zone 200. Communication zone 200 includes a selection device 205 configured for user selection of one of a plurality of mobile devices for wireless communication with computing device 120. Communication zone 200 might also include a set of indicators 210 that are configured to indicate the mobile device selected for wireless communication with computing device 120.

Selection device 205 might include a scroll wheel, a touch pad, a set of scroll buttons (e.g., an up-scroll button and a down-scroll buttons) or the like that are configured for user selection of a mobile device. Indicators 210 might include one or more LEDs, a display or the like that are configured to indicate wireless transmissions as described above with respect to indicators 170.

According to one embodiment, selection device 205 is also a button device that is configured to provide a button function. The selection device may be pressed by a user to activate the button device. The selection device, if pressed by a user to activate the button function, may be configured to effect the wireless transfer of information between the computing device and a mobile device selected by the selection device. The button function may be selected if selection device 205 is pressed, tapped or the like. For example, if selection device 205 is a scroll wheel, the scroll wheel might be pressed (or clicked) to effect the transfer of information between the computing device and a mobile device. Alternatively, if the selection device is touch pad (e.g., resistance touch pad and/or a capacitive touch pad) the button function of the touch pad may be activated by tapping on the touch pad (e.g., a user tapping their finger on the touch pad).

According to another embodiment, indicators 210 are configured to provided a button function to effect wireless information transfer. For example, an LED configured to indicate a selected mobile device might be pressed (e.g., the LED might coupled to a switch device such that the LED is configured to provide a button function) by a user to effect wireless information transfer. Alternatively, if the indicator is a display, the display may be configured to perform the button function to effect information transfer. For example, the display may include a resistive touch pad, a capacitive touch pad or the like that is configured to provide the foregoing described button function. According to some embodiments, the selection device and the indicator are the same device. For example, the selection device and the indicator might include a liquid crystal display having touch pad features.

According to another embodiment, one or more function keys a set of function keys 160 may be configured to provide the foregoing described communication functions. For example, the set of function keys may be respectively associated with a set of mobile devices, and may be configured to effect information transfer between the computing device and the mobile devices. Icons and/or text may be disposed adjacent the function keys or on the function keys to indicate the associations between the function keys and the mobile devices.

According to one embodiment, information-transfer system 100 includes a control device 300 that includes a communication zone 310. Control device 300 might be a mouse, a trackball, joystick, gamepad, touch pad or the like. Communication zone 310 might include one or more communication zones 140a, 140b, and 200 described above that are configured to effect wireless communication between the computing device and a mobile device.

Figure 2:
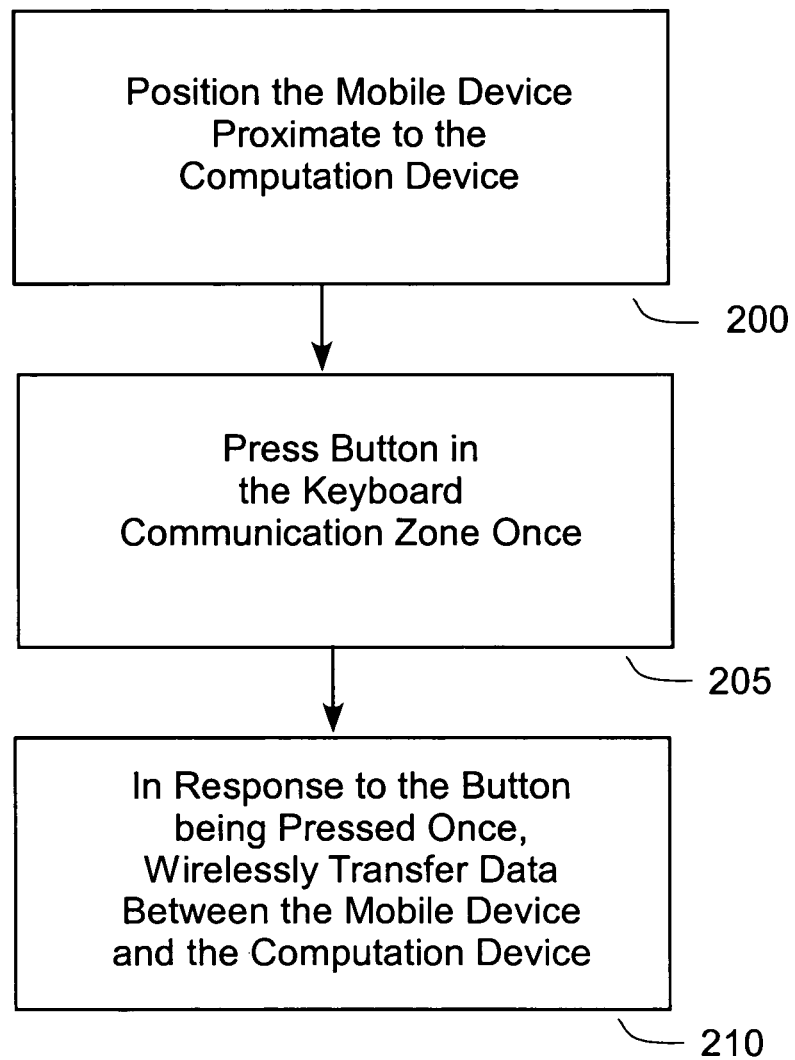
FIG. 2 is a high-level flow chart having steps for transferring information between a computer and a mobile device that are configured to wirelessly communicate with one another according to an embodiment of the present invention.

FIG. 2 is a high-level flow chart having steps for effecting the wireless transfer (e.g., synchronizing) of information between a computing device and a mobile device. The high-level flowchart is merely illustrative of an embodiment incorporating the present invention and does not limit the scope of the invention as recited in the claims. One of ordinary skill in the art will recognize variations, modifications, and alternatives. At 200, at least one mobile device of a set mobile devices is locally positioned with respect to a computing device that is configured to wirelessly communicate with the mobile devices. The mobile device might be locally positioned with respect to the computing device if the mobile device is at or within about fifteen meters of the computing device. At 205, a button that is included in a communication zone of an input device (e.g., a keyboard, mouse, etc.) is pressed a single time by a user. At 210, in response to the button being pressed a single time, information is wirelessly transferred between (e.g., one-way transfer or two-way transfer) the computing device and the mobile device. For example, the computing device and the mobile device might synchronize their respective databases based on the transferred information.

Figure 3:
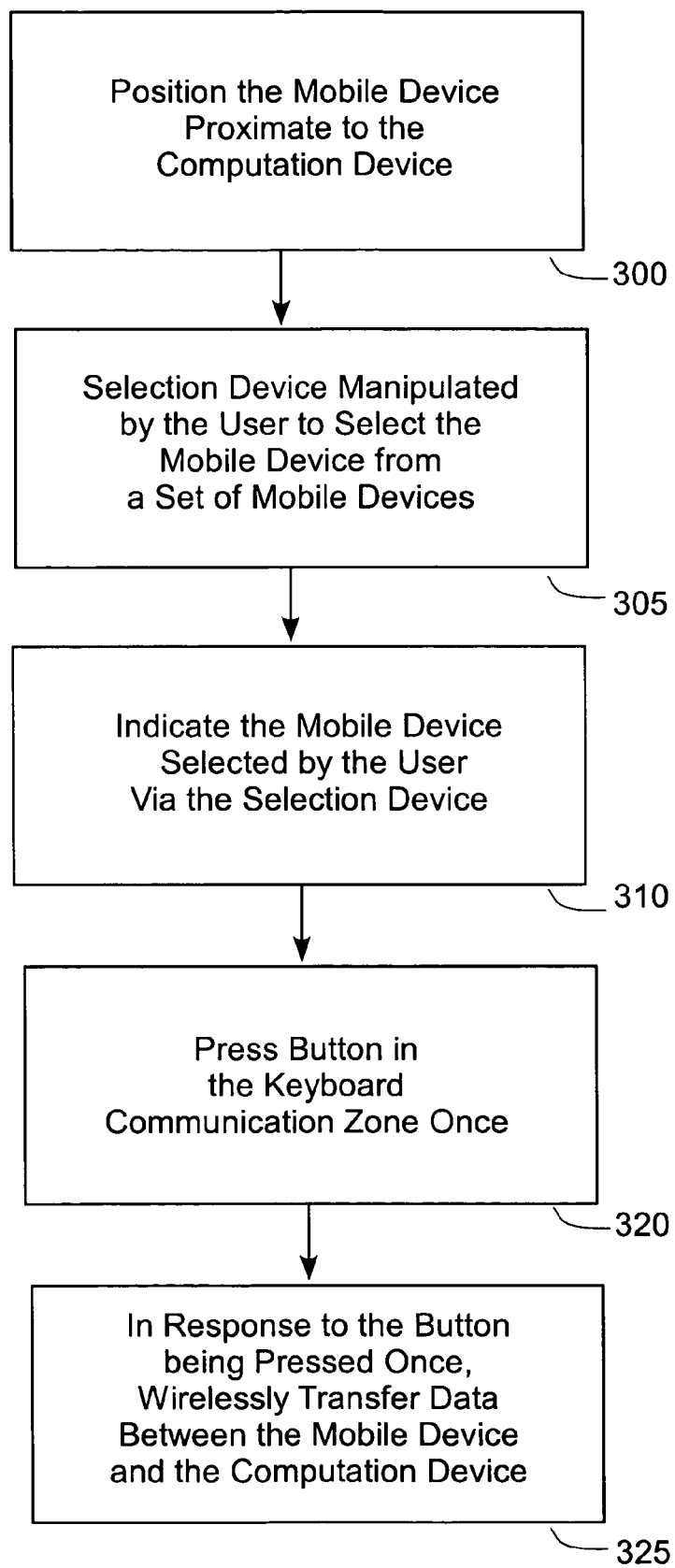
FIG. 3 is a high-level flow chart having steps for transferring information between a computer and a mobile device that are configured to wirelessly communicate with one another according to another embodiment of the present invention.

FIG. 3 is a high-level flow chart having steps for wirelessly transferring (e.g., synchronizing) information between a computing device and one mobile device of a set of mobile devices. The high-level flowchart is merely illustrative of an embodiment incorporating the present invention and does not limit the scope of the invention as recited in the claims. One of ordinary skill in the art will recognize variations, modifications, and alternatives. At 300, at least one mobile device of a set mobile devices is locally positioned with respect to a computing device that is configured to wirelessly communicate with the mobile devices. At 305, a selection device is manipulated by a user to select the mobile device from the set of mobile devices. The selection device might be a scroll wheel that is configured to be rotated by a user to select the mobile device. At 310, an indicator indicates the mobile device selected by the user using the selection device. At 315, a button is pressed by the user a single time. The selection device might be or might include the button. At 320, in response to the button being pressed a single time, information is wirelessly transferred between the computing device and the mobile device. For example, the computing device and the mobile device might synchronize their respective databases based on the wirelessly transferred information.

It is to be understood that the examples and embodiments described above are for illustrative purposes only and that various modifications or changes in light thereof will be suggested to persons skilled in the art and are to be included within the spirit and purview of this application and scope of the appended claims. For example, while a number of keys are shown in communication zones 140a and 140b, each of the communication zones might includes a single key configured to effect wireless information transfer between a computing device and a mobile device. Further, while various embodiments have been described herein as being configured to effect wireless-data transfer between a computing device and a mobile device, the communication-zone buttons descried herein may be configured to effect wired-data transfer, such as a Universal Serial Bus connection, between a computing device and a mobile device. Further yet, while embodiments of the present invention have been described as providing wireless communication with a mobile device that is up to fifteen meters from a computing device, the wireless communication distance may be more than fifteen meters, depending for example, on the particular electromagnetic frequency (e.g., radio frequency) used for data transmission. Therefore, the above description should not be taken as limiting the scope of the invention as defined by the claims.

What is claimed is:

1. A control device configured to provide control commands to a computing device, such that the computing device is configured to wirelessly communicate information with a mobile device, the control device comprising:
   a communication zone including at least one button configured to be pressed once by a user to effect wireless-data transfer between the computing device and the mobile device,
   wherein the wireless-data transfer includes a data-synchronization transfer to synchronize the local database of the computing device with a local database of the mobile device,
   wherein the communication zone further includes a plurality of buttons, which includes the first mentioned button, wherein each button is configured to be pressed once to effect a wireless-data transfer between the computing device and a corresponding mobile device of a plurality of mobile devices, which includes the first mentioned mobile device, if the corresponding mobile device is proximately positioned with respect to the computing device.

2. The control device of claim 1, wherein the mobile device is proximately positioned with respect to the computing device if the mobile device is approximately at or within about fifteen meters of the computing device.

3. The control device of claim 1, further comprising at least one of an icon and text configured to identify the mobile device.

4. The control device of claim 1, wherein the control device is a keyboard.

5. The control device of claim 4, wherein the communication zone is positioned at approximately a forward-corner area of a top surface of the keyboard.

6. The control device of claim 1, wherein the mobile device includes at least one of a mobile telephone, a personal digital assistant, a digital camera, a digital-video camera, a digital-music player, and a smart-mobile telephone.

7. The control device of claim 1, wherein the wireless-data transfer includes at least one of a text message, an audio file, a video file, a picture file, and contact information.

8. The control device of claim 1, wherein the communication zone includes at least one of a plurality of icons and a plurality of text respectively associated with the plurality of buttons and that are configured to identify the mobile devices that are respectively associated with the buttons.

9. The control device of claim 1, wherein the plurality of mobile devices includes at least one of a mobile telephone, a personal digital assistant, a digital camera, a digital-video camera, a digital-music player, and a smart-mobile telephone.

10. The control device of claim 1, wherein the wireless data transfer includes at least one of a text message, an audio file, a video file, a picture file, a note, and contact information.

11. The control device of claim 1, further comprising another communication zone including another button configured to be pressed once to effect wireless-data transfer between the computing device and another mobile device that is locally positioned with respect to the computing device.

12. The control device of claim 1, wherein the control device is a mouse.

13. The control device of claim 1, wherein the computing device includes at least one of a personal computer, a laptop computer, a personal digital assistant, and a server computer.

14. The control device of claim 1, wherein the button is a scroll wheel and the scroll wheel is configured to be rotated by a user to select the mobile device from a plurality of mobile devices configured to wirelessly communicate with the computing device.

15. The control device of claim 14, further comprising a display configured to indicate the mobile device of the plurality of mobile devices selected by the scroll wheel.

16. The control device of claim 15, wherein the display includes one or more LEDs respectively associated with the mobile devices.

17. The control device of claim 15, wherein the display is configured to display at least one of an icon and text that indicates the mobile device selected by the scroll wheel.

18. A communication system comprising:
   a local database;
   a control device having at least one button;

a computing device operatively coupled to the control device, the computing device including at least one database; and a mobile device configured to wirelessly communicate with the computing device if the button is pressed once by a user, wherein the wireless communication includes a data-synchronization transfer to synchronize the local database of the computing device with a local database of the mobile device, wherein the control device further includes a plurality of buttons, which includes the first mentioned button, wherein each button is configured to be pressed once to effect the wireless-data transfer between the computing device and a corresponding mobile device of a plurality of mobile devices, which includes the first mentioned mobile device, if the corresponding mobile device is proximately positioned with respect to the computing device.

19. The control device of claim 18, wherein operatively coupled includes hardwire coupling or wireless coupling.

20. The control device of claim 18, wherein the mobile device is proximately disposed with respect to the computing device if the mobile device is approximately at or within about fifteen meters of the computing device.

21. The control device of claim 18, wherein the control device is a keyboard.

22. The control device of claim 18, wherein the mobile device includes at least one of a mobile telephone, a personal digital assistant, a digital camera, a digital-video camera, a digital-music player, and a smart-mobile telephone.

23. The control device of claim 18, wherein the wireless data transfer includes at least one of a text message, an audio file, a video file, a picture file, a note, and contact information.

24. The control device of claim 18, wherein the control device is a mouse.

25. A communication system comprising:
a control device having at least one button;
a computing device operatively coupled to the control device, the computing device including at least one database; and
a mobile device configured to communicate with the computing device by a Universal Serial Bus connection if a button is pressed once by a user, the mobile device including at least one database,
wherein the communication includes synchronizing the at least one database of the computing device with the at least one database of a mobile device,
wherein the control device further includes a plurality of buttons, which includes the first mentioned button, wherein each button is configured to be pressed once to effect a data transfer between the computing device and a corresponding mobile device of a plurality of mobile devices, which includes the first mentioned mobile device.

26. A control device comprising:
a communication zone including a scroll wheel configured to be scrolled by a user to select a mobile device from a plurality of mobile devices, and at least one button configured to be pressed once to effect a wireless-data transfer between a computing device and the mobile device selected from the plurality of mobile devices,
wherein the wireless-data transfer includes a data-synchronization transfer to synchronize the local database of the control device with a local database of the mobile device,
wherein the communication zone further includes a plurality of buttons, which includes the first mentioned button, wherein each button is configured to be pressed once to effect the wireless-data transfer between the computing device and a corresponding mobile device of the plurality of mobile devices, which includes the first mentioned mobile device, if the corresponding mobile device is proximately positioned with respect to the computing device.

27. The control device of claim 26, wherein the scroll wheel and the button are the same device.

28. The control device of claim 26, further including a display configured to indicate the mobile device selected by the scroll wheel.

29. The control device of claim 28, wherein the display includes one or more LEDs respectively associated with the mobile devices.

30. The control device of claim 28, wherein the display is configured to display at least one of an icon and text that indicates the mobile device selected by the scroll wheel.

31. The control device of claim 28, wherein the display is a liquid crystal display.

32. A method for wirelessly transferring information between a computing device and a mobile device comprising:
pressing a key in a communication zone of a control device a single time;
in response to the single key press, transferring information between the computing device and the mobile device if the mobile device is locally positioned with respect to the computing device,
wherein the information is operable to perform one-way or two-way synchronization between one or more databases of the computing device and one or more databases of the mobile device,
wherein the communication zone further includes a plurality of key, which includes the first mentioned key, wherein each key is configured to be pressed once to effect a wireless-data transfer between the computing device and the corresponding mobile device of a plurality of mobile devices, which includes the first mentioned mobile device, if the corresponding mobile device is proximately positioned with respect to the computing device.

33. The method of claim 32, wherein the mobile device is proximately positioned if the mobile device is substantially at or within about fifteen feet of the computing device.

34. The method of claim 32, further comprising scrolling a scroll wheel to select the mobile device from a plurality of mobile devices.

35. The method of claim 34, wherein the key and the scroll wheel are the same device.

36. The method of claim 34, further comprising indicating the mobile device selected by the scroll wheel on a display.

37. The method of claim 36, wherein the step of indicating further includes displaying on the display at least one of an icon and text that indicates the mobile device selected by the scroll wheel.

38. The method of claim 36, wherein the step of indicating further includes lighting an LED that indicates the mobile device selected by the scroll wheel.

39. The method of claim 38, wherein the LED is configured to radiate a discrete color from a plurality of colors that is respectively associated with the plurality of mobile devices.

40. The method of claim 39, wherein the step of indicating further includes lighting one of a plurality of LED to indicate the mobile device selected by the scroll wheel.

* * * * *